United States Patent
Zhang

[19]

[11] Patent Number: 6,140,791
[45] Date of Patent: Oct. 31, 2000

[54] METHOD AND APPARATUS FOR CONTROLLING THE ACCELERATION TRAJECTORY OF POSITIONING A HIGH-VELOCITY TRANSDUCER AND FOR REDUCING THE HARMONIC CONTENT THEREOF

[75] Inventor: Xiao (John) Zhang, Cupertino, Calif.

[73] Assignee: Samsung Information Systems America, San Jose, Calif.

[21] Appl. No.: 09/329,255

[22] Filed: Jun. 10, 1999

[51] Int. Cl.[7] .................................................. G05D 23/275
[52] U.S. Cl. .......................... 318/632; 318/560; 318/704; 318/715; 318/721; 318/832
[58] Field of Search .................................... 318/632, 560, 318/701, 715, 721, 832

[56] References Cited

U.S. PATENT DOCUMENTS

| | | | |
|---|---|---|---|
| 5,128,813 | 7/1992 | Lee | 318/561 |
| 5,510,939 | 4/1996 | Lewis | 318/832 |
| 5,841,262 | 11/1998 | Tang | 318/701 |

*Primary Examiner*—Karen Masih
*Attorney, Agent, or Firm*—Jones Volentine, L.L.P.; Jeffrey P. Aiello

[57] ABSTRACT

A sinusoidal acceleration trajectory controller is used in positioning a transducer at high speed to minimize vibration and acoustic noise. The controller reduces vibration and acoustic noise without sacrifice of seeking time by using a sinusoidal waveform as the actuator input. This sinusoidal waveform is a function of target track position and the seeking terminal time. When the velocity of the read/write head on the transducer reaches a maximum velocity, the sinusoidal waveform becomes a segment sinusoidal waveform, including a zero value waveform between two half sinusoidal waveforms. The amplitude of the sinusoidal waveforms and the coast period are minimized to obtain the minimum harmonic content in the segment sinusoidal waveform.

26 Claims, 7 Drawing Sheets

FIG.1A

WITH THE COAST MODE

FIG.1B

WITHOUT THE COAST MODE

METHOD AND APPARATUS FOR CONTROLLING THE ACCELERATION TRAJECTORY OF POSITIONING A HIGH-VELOCITY TRANSDUCER AND FOR REDUCING THE HARMONIC CONTENT THEREOF

BACKGROUND OF INVENTION

1. Field of the Invention

The present invention generally relates to an apparatus and a method for reducing vibration and acoustic noise when performing a high-speed positioning operation of a transducer such as a magnetic head, an optical head and a print head etc. More particularly, the present invention relates to an actuator and related method of operation that is controlled so as to reduce the harmonic content and amplitude in a control current for controlling its acceleration.

2. Description of the Related Art

In order to read data from or write data to a hard disk drive (HDD) system, a read/write head in the HDD must be accurately positioned over a desired track and sector of a magnetic recording disk in the HDD. This is generally done through the means of a seeking operation. As the speed of computers increases, however, it becomes more and more necessary to decrease the time allowed for positioning the read/write head, so that the access speed of data in the HDD is increased. As a result, there is a continued pressure to decrease the time required for a seeking operation, while maintaining the accuracy of the operation.

In performing seek operations, conventional disk drive devices generally use a multi-mode algorithm to meet wide dynamic control ranges. A short seek operation generally includes three control modes: a linear mode, a settle mode, and an on-track mode. A long seek operation generally includes at least five or six control modes including: an acceleration mode, a coast mode, and a deceleration mode, as well as the three linear mode, settle mode, and on-track mode from a short seeking operation. The coast mode may or may not be required, depending upon the length of the long seek operation.

A short seek operation is generally performed when the seek distance is extremely short, generally from three to five tracks, depending upon the specific HDD system implementation. Short seek operations and the three modes used in them are well known in the art, and so will not be discussed in detail here.

A long seeking operation uses the additional three modes (acceleration, coasting, and deceleration) to position the read/write head from any given location to the vicinity of the desired track, i.e., within about three to five tracks. The next three modes (linear, settle, and on-track) are then used for a finer adjustment of the position of the read/write head.

During the acceleration mode, an actuator that holds the read/write head is accelerated up towards a maximum velocity as it moves towards the desired track. Once the read/write head reaches the maximum velocity, the system enters the coast mode and the read/write head coasts for a time at the maximum velocity. Generally, the system carries out a closed-loop velocity control to keep the read/write head moving at the maximum velocity. When the read/write head reaches the proper location, the system enters the deceleration mode to decelerate the read/write head so that it comes to rest in the vicinity, i.e., within three to five tracks, of the target track.

Of course, for a short enough long seeking operation, the coast mode may not be needed, since the read/write head may not reach its maximum velocity before it's time to decelerate. In this case, the seeking operation will enter an acceleration mode to move to the read/write head to a lesser velocity and will then enter a deceleration mode to bring the read/write head to rest in the vicinity of the target track.

The first three modes in a long seeking operation (acceleration, coast, and deceleration) are primarily responsible for any vibration or acoustic noise that the system experiences. These three modes are implemented through a velocity-tracking structure in conventional disk controllers. In these velocity tracking structures, an estimator is used to construct a velocity feedback signal since there is no velocity feedback sensor in normal systems. In this estimator, a velocity trajectory generator is used to generate a velocity trajectory as a function of the distance remaining for the read/write head to travel. The fastest trajectory is then determined by driving the HDD motor's inertia and torque constant. If this trajectory is used, it constructs a time optimal controller, which can also be called a Bang—Bang controller.

In other words, the actuator uses a maximum current to accelerate the system and uses a maximum current to decelerate the system. This controller is not practical, however, because it is too sensitive to position error and to noise. Therefore, many modifications have been used to obtain more stable positioning and better noise control.

One conventional hard disk drive seek operation is performed as follows. First, a target track is input into a control system and the control system determines whether a long or short seek is required to move from the present track to the target track. As noted above, a short seek operation is used if the seek distance, i.e., the distance from the current track to the target track, is at or below a given threshold, e.g., three to five tracks. Otherwise, a long seek operation is used.

If a long seek is required, a voice coil motor (VCM) in the HDD is supplied with a current based on a square-like wave acceleration seek trajectory profile to accelerate the read/write head up to a maximum velocity. The current to the VCM is then stopped when the maximum velocity is reached and the system enters a coast mode in which the read/write head coasts at the maximum velocity. Then, when the read/write head reaches the proper track position, it begins to decelerate by receiving a square-like wave deceleration seek trajectory profile.

If the long seek is of a short enough distance that the maximum velocity is not reached, the coast mode is omitted. In this case, the VCM in the HDD is supplied with a square-like wave acceleration seek trajectory profile to accelerate the read/write head up towards the maximum velocity. However, before it reaches the maximum velocity, the VCM is then stopped and begins to decelerate based on the square-like wave deceleration seek trajectory profile.

Once the read/write head is within three to five tracks of its target track, whether by acceleration, coasting, and deceleration in a long seek, or at the start if the seek operation is a short seek operation, the system will enter the linear mode directly. After it completes the linear mode, the system enters a settle mode and an on-track mode.

Figure 1A:
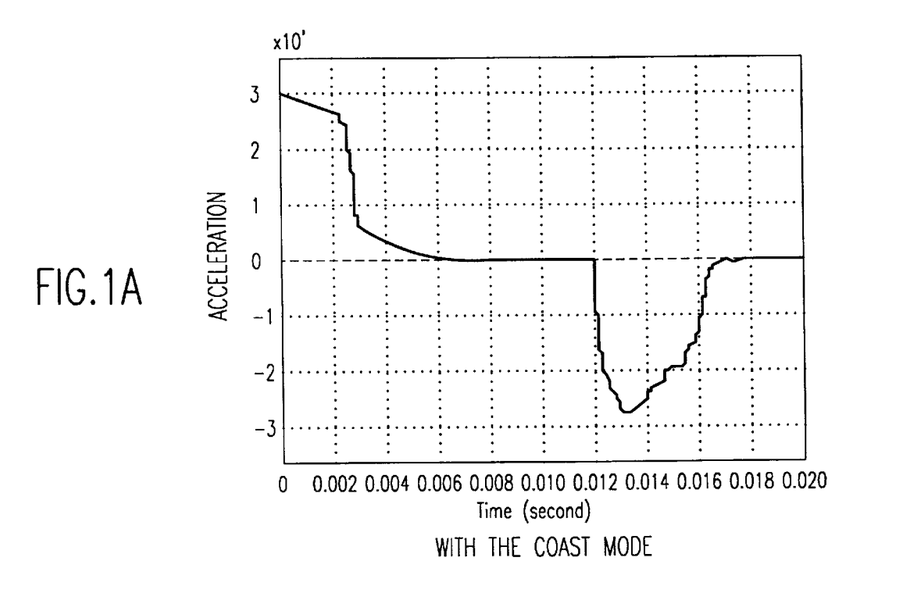
FIG. 1A is a graph showing a conventional seek trajectory profile with a coast mode, using a square-like waveform.
Figure 1B:
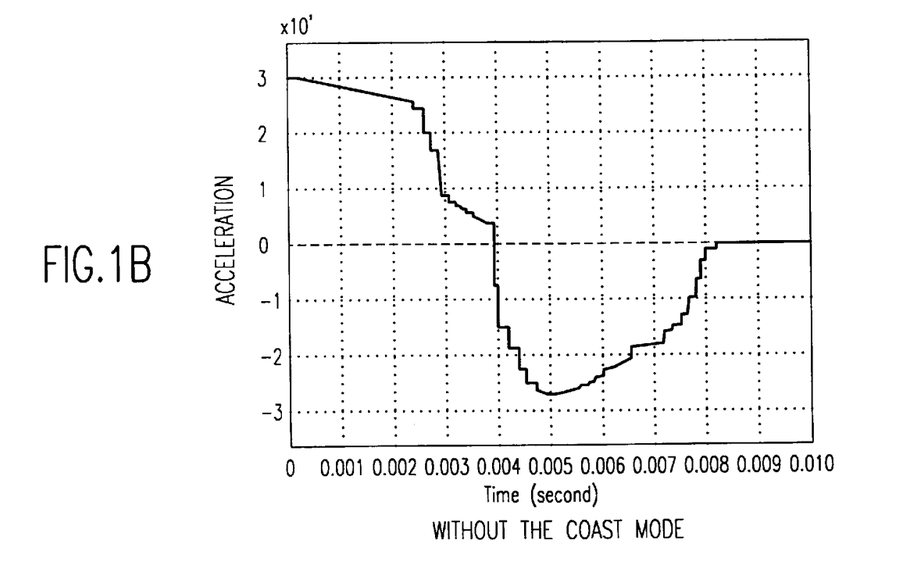
FIG. 1B is a graph showing a conventional seek trajectory profile without a coast mode, using a square-like waveform.

FIGS. 1A and 1B are examples of conventional seek trajectory profiles. In particular, FIG. 1A is a graph showing a conventional square-wave seek trajectory profile with a coast mode; and FIG. 1B is a graph showing a conventional square-wave seek trajectory profile without a coast mode.

The acceleration in a seeking operation is achieved by running a current to the actuator in the HDD. As shown in FIGS. 1A and 1B, in this conventional operation, the current is provided as a square-like wave. In FIG. 1A, the acceleration rises until the maximum velocity is reached, levels off to zero during the coast mode, and drops to a maximum deceleration before slowly rising again until the actuator arm comes to a stop.

However, the VCM is a very rigid structure, having a natural frequency above 3.5 KHz. As a result, a high frequency of operation above 3.5 KHz will excite this natural frequency and cause resonance. This means that in a long seek using a square-like wave, to control the VCM, the assembly may resonate. And if the resonance cannot be quickly decayed, it will have an undesirable effect on track accuracy.

In addition, the VCM assembly itself moves very fast, having a bandwidth above 550 Hz. As a result, the backward-forward motion of the assembly itself causes vibrations and acoustic noise.

Because of these problems, numerous efforts have been made in conventional disk drive devices to reduce vibration and acoustic noise. These efforts at reducing vibration and acoustic noise can be categorized generally into three approaches: the use of mechanical designs, the use of damping material, and the use of a special seeking trajectory profile.

When employing mechanical designs, the structure of a read/write head and the associated HDD equipment are modified to reduce the noise generated by the motion of the read/write head. In a conventional HDD system, a read/write head is fixed to a transducer suspension arm and actuator. This assembly structure can be designed so as to be so rigid that its resonance frequencies are extremely high.

Normally, those frequencies are chosen to be sufficiently high to be far away from the servo bandwidth. However, with the increasing density of data storage systems, correspondingly higher servo bandwidths are required, which in turn demands higher resonance frequencies. Therefore, using currently-available materials and structures, both mechanical design and related servo design are being pushed to the maximum of their capabilities, with a corresponding increase to their cost.

As these servo bandwidths continue to rise, it becomes very difficult to predict whether the mechanical resonance frequencies can be pushed far enough away from the servo bandwidth to be effective. As result, there is a higher possibility that the mechanical structure, with its limited resonance frequencies, will be excited by rich harmonic content in a conventional, "square wave-like" control currents.

One other approach for reducing vibration and acoustic noise is the use of damping materials in a hard disk drive. Damping materials can be used to absorb some resonant energy, but they are significantly limited by the structure of the data storage systems. Common damping materials are mostly made of a rubber-like material, which can be very difficult to assemble into hard disk drive housings. In addition, hard disk drive housings must be very clean inside, and housings made with damping materials cannot meet such stringent cleanliness requirements. As a result, although damping materials can reduce vibration and acoustic noise, they generally cause more problems than they solve.

Finally, efforts have been made to reduce vibration and acoustic noise using special seeking trajectory profiles. The use of a special seeking trajectory profile has proven to be the most worthwhile approach to eliminate vibration and acoustic noise in a hard disk drive system. Its basic principle is to look for an acceleration trajectory profile with a narrow harmonic content and a lower amplitude that prevents any potential vibration from the transducer that has the same seeking time as a "square wave-like" control input.

In U.S. Pat. No. 5,151,639, optimal control theory is used to obtain a special acceleration trajectory that mathematically minimizes the derivative of acceleration (or the current that drives the acceleration) in a seek head, i.e. di/dt. This trajectory is similar to a sinusoidal wave, but the algorithm is extremely complicated for a microcomputer to implement it due to the presence of six order polynomial equations involved in its calculation.

Figure 2:
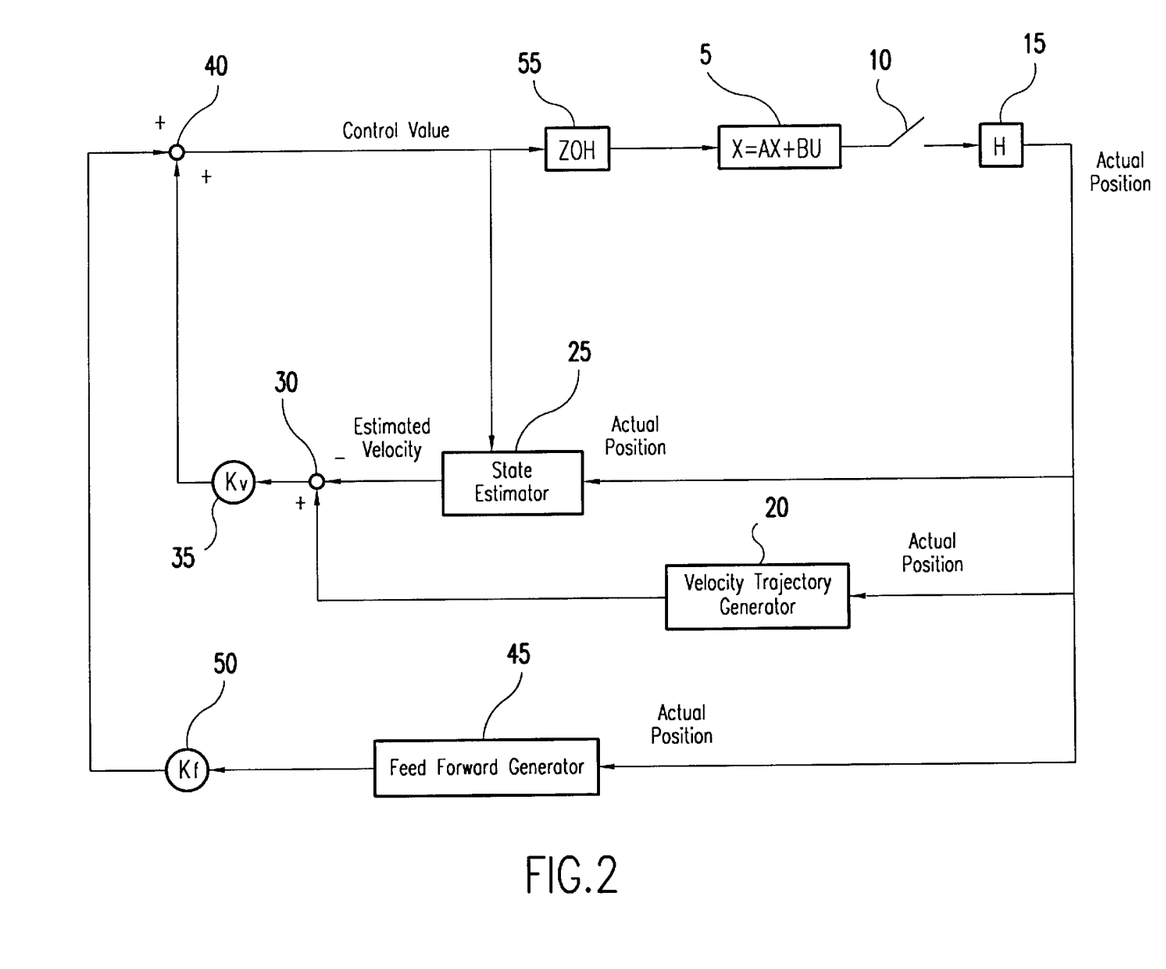
FIG. 2 is a block diagram showing the processing of the projected position, velocity, and acceleration of a conventional system.
Figure 3A:
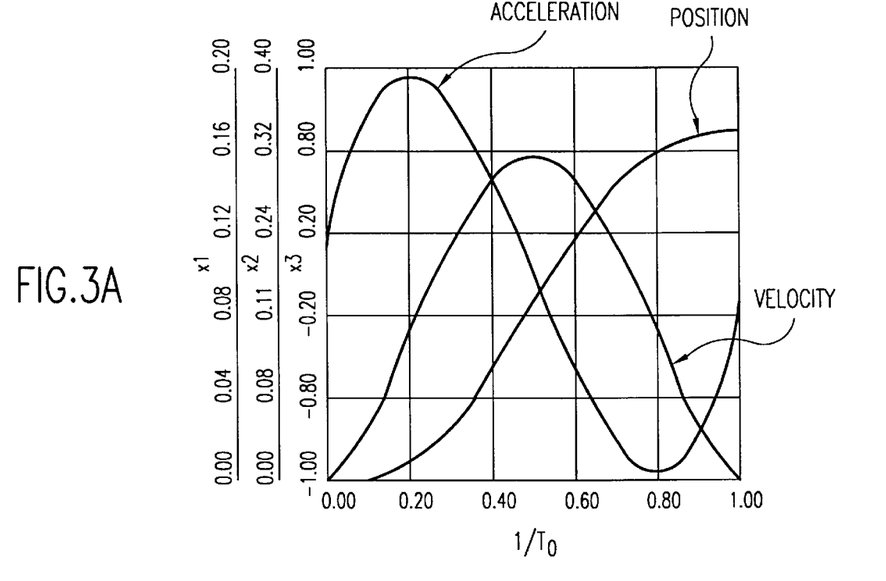
FIGS. 3A and 3B are graphs showing seek trajectory profiles a for conventional pseudo-sinusoidal system.
Figure 3B:
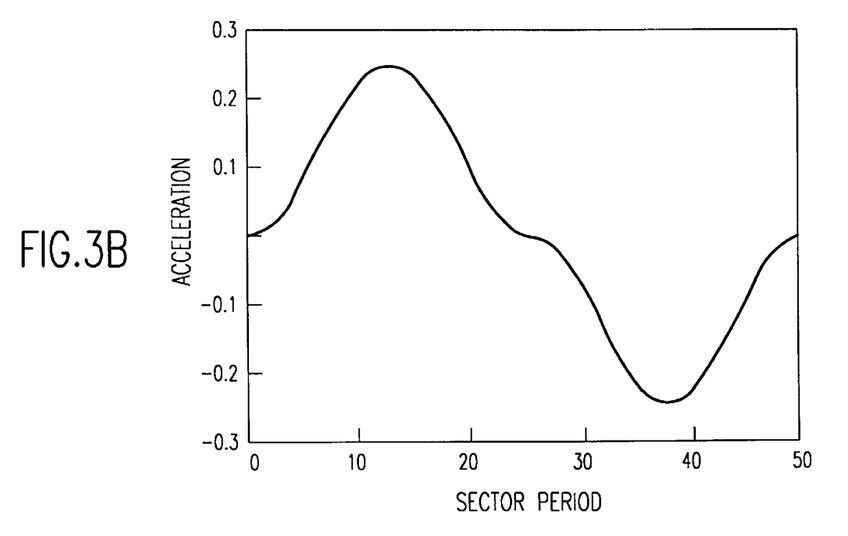

U.S. Pat. No. 5,465,034 offers another method for further reducing the harmonic content in a control current. In the disclosed system, a symmetrical sinusoidal-like wave is developed at the expense of seek time. This sinusoidal-like wave is specially designed to realize both symmetrical and single mode operation. FIG. 2 is a block diagram showing the processing of the projected position, velocity, and acceleration of a conventional system, and FIGS. 3A and 3B show examples of sinusoidal-like waves from this design.

As shown in FIG. 2, an analog actual position signal produced from an actuator 5 indicates the actual location of an HDD actuator read/write head with respect to the tracks on a hard disk. This signal passes through a sampler 10 and an analog-to-digital converter 15 to produce a digital actual position signal indicative of the measured actual location of the read/write head. This actual position signal is provided to a velocity trajectory generator 20 and a state estimator 25.

The velocity trajectory generator 20 generates a velocity trajectory profile in response to the actual position signal, and provides this profile to a positive input of a first adder 30. The state estimator 25 generates an estimated velocity based on the actual position signal and a control signal, and provides this estimated velocity to a negative input of the first adder 30. The output of the first adder 30 is provided to a first state controller 35, which in turn provides its output to a first positive input of a second adder 40.

The feed forward generator 45 uses the measured position signal to generate a feed forward position vector. This signal is sent to a second state controller 50, which provides its output to a second positive input of the second adder 40.

The second adder 40 generates the control signal, which is sent to both the actuator 5 and the state estimator 25. On its way to the actuator 5, the control signal passes through a digital-to-analog converter, such as a zero order hold (ZOH) 55. The control signal acts to control the operation of the actuator 5.

FIGS. 3A and 3B show examples of the sinusoidal-like waves that results from the prior art. As seen in FIGS. 3A and 3B, there is a very slow acceleration at the beginning of the waveform. For symmetry, a very slow deceleration can also be seen at end of the waveform. As a result, this causes long seeking time, which is very difficult to be adapted into most high performance data storage systems. In addition, this method uses a large look-up table and involves the use of a sorting algorithm, which can further burden the real-time operation of a microcomputer or digital signal processor.

In reality, there are two physical restrictions in maximum head motion velocity and the maximum current to the actuator. The maximum current is limited by the coil of the VCM and the integrated circuit that controls the VCM. The maximum velocity is limited by the head's ability to reliably read from the disk. The velocity must be kept at a level where data can still be read by the head. These restrictions directly affect the acceleration trajectory, whether in conventional "square wave-like" systems, or in the "sinusoidal wave-like" systems described above.

However, in the conventional methods described above, there is no information released relating with how to deal with those two limitations. As a result, these two methods have been limited in practice.

SUMMARY OF THE INVENTION

It is a main object of the present invention to provide a high-velocity positioning servo system for the realization of an acceleration trajectory control of an actuator without the generation of vibration and acoustic noise in a transducer, such as a magnetic read/write head, an optical read/write head, a print head, or the like.

It is second object of the present invention to provide trajectories and a positioning servo system according to a simple algorithm implementation for a microcomputer or a digital signal processor.

In more detail, the present invention may be implemented using a driver for moving an actuator and a transducer, such as a magnetic read/write head, fixed to the actuator, and a servo controller for controlling the driver using digital arithmetic. A continuous sinusoidal function is designed as a feed forward acceleration trajectory to control the actuator to generate an actual acceleration trajectory. A feed forward velocity and a position profile corresponding to the feed forward acceleration can be generated through the use of a double integrator system.

When the acceleration and velocity of the actuator reach a set physical upper limit, a sinusoidal segment function is used as the actual acceleration trajectory to replace the continuous sinusoidal function. Both continuous and segment sinusoidal function are functions of the seeking operation's seeking time and seeking length. These trajectories as states in a control system are used as command and feed forward signals. Combined with state estimation feedback, the input of actuator is controlled to obtain the waveform expected in either continuous or segment sinusoidal function.

To achieve the goals set forth above, a control circuit is provided for controlling a seeking operation for an actuator in a high speed servo device. The control circuit comprises a state estimator for receiving an actual position signal that indicates the current actual position of the actuator and for generating an estimated actual velocity signal, a feed forward acceleration generation circuit for generating a sinusoidal feed forward acceleration signal based on the actual position signal at a starting point and a target position signal that indicates a target seek track, a double integrator for integrating the feed forward acceleration signal once to generate a feed forward velocity signal and twice to generate a position profile signal, a first correction circuit for generating a first correction signal based on the actual position signal and the position profile signal, a second correction circuit for generating a second correction signal based on the estimated actual velocity signal and the feed forward velocity signal, a control signal generation circuit for generating a control signal to control the operation of the actuator based on the feed forward acceleration signal, the first correction signal, and the second correction signal, wherein the control signal is also supplied to the state estimator.

The feed forward acceleration generation circuit may further comprise a feed forward acceleration controller for generating an amplitude signal and a frequency signal based on the actual position signal at the starting point and the target position signal, and a sine/cosine look-up table for generating the feed forward acceleration signal in accordance with the amplitude signal and the frequency signal. In the alternative, the feed forward acceleration generation circuit may further comprise a seeking length to seeking time converter for generating an amplitude signal and a frequency signal based on the actual position signal at the starting point and the target position signal, and for generating a coast mode start time signal and a coast mode stop time signal that indicate the starting and stopping times, respectively, of a coast mode, a coast mode control logic for generating a coast control signal based on the coast mode start time signal and the coast mode stop time signal, and a sine/cosine look-up table for generating the feed forward acceleration signal in accordance with the amplitude signal, the frequency signal, and the coast control signal.

The first correction circuit may comprise an adder that accepts the actual position signal at a negative input and the position profile signal at a positive input, and the second correction circuit may comprise an adder that accepts the estimated actual velocity signal at a negative input and the feed forward velocity signal at a positive input.

The feed forward acceleration signal preferably has a continuous sinusoidal waveform when the seeking operation does not require a coast mode and preferably has a segmented sinusoidal waveform when the seeking operation requires a coast mode. The feed forward acceleration generation circuit preferably determines whether the seeking operation requires a coast mode by determining whether a total seeking length is greater than a threshold seeking length. Int his case, the total seeking length is determined by comparing the target position signal with the starting position signal.

A method is also provided for controlling a seeking operation for an actuator in a high speed servo device. The method comprises: generating an estimated actual velocity for the actuator based on a current actual position of the actuator and a control value, generating a sinusoidal feed forward acceleration for the actuator based on a starting actual position of the actuator, which indicates a starting track at the beginning of the seeking operation, and a target position for the actuator, which indicates a target track for the seeking operation, generating a feed forward velocity that is the integral of the feed forward acceleration, generating a position profile that is the integral of the feed forward velocity, generating a first correction value based on the current actual position and the position profile, generating a second correction value based on the estimated actual velocity and the feed forward velocity, generating the control value based on the feed forward acceleration, the first correction value, and the second correction value; and controlling the movement of the actuator based on the control value.

The step of generating the feed forward acceleration may further comprise: generating an amplitude and a frequency based on the starting actual position and the target position, and generating the feed forward acceleration in accordance with the amplitude and the frequency by looking up sine values in a sine/cosine look-up table. In the alternative, the step of generating the feed forward acceleration may further comprise: generating an amplitude and a frequency signal based on the starting actual position and the target position, determining a coast mode start time and a coast mode stop time that indicate the starting and stopping times, respectively, of a coast mode, generating a coast control based on the coast mode start time and the coast mode stop time, and generating the feed forward acceleration in accordance with the amplitude, the frequency, and the coast control by looking up sine values for the feed forward acceleration in a sine/cosine look-up table when the seeking operation is not in the coast mode and by applying a zero-value to the feed forward acceleration when the seeking operation is in the coast mode.

The first correction value is preferably the position profile minus the current actual position, and the second correction value is preferably the feed forward velocity minus the estimated actual velocity.

The feed forward acceleration preferably has a continuous sinusoidal waveform when the seeking operation does not require a coast mode and has a segmented sinusoidal waveform when the seeking operation requires a coast mode. The step of generating the feed forward acceleration preferably determines whether the seeking operation requires a coast mode by determining whether a total seeking length is greater than a threshold seeking length, wherein the total seeking length is determined by comparing the target position with the starting actual position.

In both the apparatus and method described above, the high speed servo device may be a hard disk drive.

BRIEF DESCRIPTION OF DRAWINGS

The above and other objects and advantages of the present invention will become readily apparent from the description that follows, with reference to the accompanying drawings, in which.

DESCRIPTION OF THE PREFERRED EMBODIMENT

In this invention, the system uses a sinusoidal waveform from the very beginning to control the movement of the actuator. In other words, the system is closed-loop from the beginning. This is in contrast to a conventional control system, which is open loop for a large part of its seeking process and only enters closed-loop operation when it begins a deceleration mode.

The present invention reduces vibration and acoustic noise through the use of a true sinusoidal seek trajectory profile and an acceleration feed forward signal.

Figure 4:
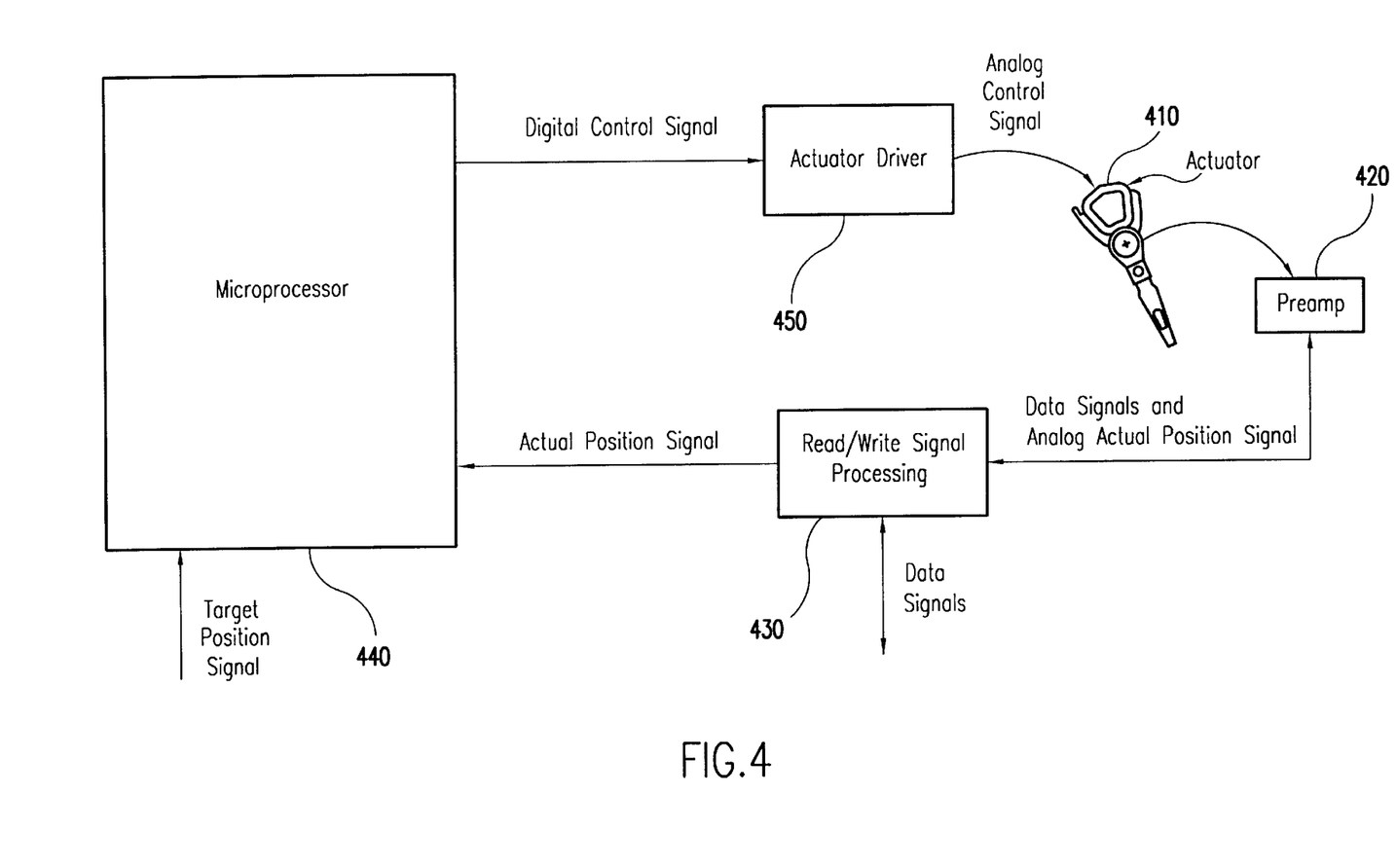
FIG. 4 is general digital signal processor control structure for a hard disk drive.

FIG. 4 is a block diagram of a portion of a hard disk drive system according to a preferred embodiment of the present invention. In accordance with this preferred embodiment, a sinusoidal servo controller is used to reduce the vibration and the acoustic noise in a transducer, such as magnetic head, optical head, or print head. Unlike conventional seek systems that either minimize seek time, but allow high vibrations and acoustic noise, or minimize vibration and acoustic noise at the expense of increasing seek time, the sinusoidal servo controller of this invention reduces vibration and acoustic noise without sacrificing seek performance.

As shown in FIG. 4, the hard disk drive system includes an actuator 410, a read/write preamp 420, a read/write signal processor 430, a microcontroller 440, and an actuator driver 450. The actuator 410 itself includes a read/write head for reading and writing data to, or from, a magnetic recording disk (not shown), and an actuator arm for moving the read/write head. However, for ease of description, the two will be referred to collectively as the actuator 410.

In operation, the magnetic recording disk rotates while the actuator 410 is moved in a seeking operation to position the head over a desired portion of the disk where data can be read from or written to. Once properly positioned, the hard disk drive performs a read or a write operation. In a write operation, data is provided from the read/write signal processor 430 to the actuator 410 via the read/write preamp 420. This data is generally provided via communication with a device external to the HDD, via a communications bus or the like.

In a read operation, data is read through the actuator 410, passes through the read/write preamp 420, and is provided to the read/write signal processor 430. Certain control information read from the disk is provided to the microcontroller 430, while the remainder of the data is generally transmitted to a device external to the HDD, via a communications bus or the like.

However, the actuator 410 must be properly positioned before data can be read from or written to the disk. The microprocessor 440 controls the operation of the actuator 410 based on the control signals received from an outside controller (not shown) and control information, such as an actual position signal, read from the disk. Based on these control signals and control information, the microcontroller 440 supplies commands to the actuator driver 450 to control the movement of the actuator 410.

The controller of this invention has a three-mode operation. These three modes are a seeking mode, a transfer mode, and a track following mode.

In the seeking mode, a true sinusoidal waveform is provided to the actuator 410 by the actuator driver 450 as the current signal for the moving the actuator 410. This is in contrast to the sinusoidal-like waveform that is used in conventional controllers.

As a result of this use of true sinusoidal waveforms, the control signal into the actuator 410 can be designed with a function of both state feedback and state feed forward signals. For a feedback signals, the system uses a current position and a current velocity of the actuator 410. The current position is supplied to the microprocessor 440 by the actuator 410 itself, through the preamp 420 and the read/write signal processor 430. The current velocity is generated from a state estimator based on the current position.

For feed forward signals, the system uses a feed forward acceleration trajectory, a feed forward velocity, and a position profile. The feed forward acceleration is read from a sine/cosine lookup table based on the seek starting track and the target track. The feed forward velocity, and the position profile are generated from the feed forward acceleration through a double integrator system.

After the seeking mode, the system enters into the transfer mode. When a sinusoidal or segment sinusoidal waveform with certain frequency and amplitude reaches zero as a state feed forward input, the position output of the double integrator has reached the target position, and the velocity feed forward state also reaches zero. However, in reality, the system parameters always change. In this situation, the actual position error, velocity, and acceleration will never be zero at same time during sinusoidal or segment sinusoidal period. Therefore, at that time, the system automatically enters the transfer mode with actual states as initial conditions.

The track following mode then follows, and is designed with a higher bandwidth and certain stability margin. Its structure is the same as for the transfer mode. The transfer mode and the track following modes are essentially the same as the linear mode, settle mode, and on-track mode of the conventional control algorithm.

According to the principle of this invention, track seeking requires two parameters for operation: a total seeking length $X_{total}$ and a seeking time $T_f$. The seeking length $X_{total}$ is an indication of the total distance that must be traversed by the actuator 410. It is determined by comparing the target track with the starting track, and determining the distance between the two. The seeking time $T_f$ is determined by multiplying the seeking length $X_{total}$ by a constant $K_f$ that is determined by experimentation for each individual HDD.

These two parameters, $X_{total}$ and $T_f$ are used to determine the amplitude A and frequency $\bar{\omega}$ of the sinusoidal waveform used as the feed forward acceleration and as the input to the double integrator. As result, a target position can be obtained as the position profile output of the double integrator. Furthermore, the feed forward velocity and the position profile determined by the double integrator can be calculated through a double integration of a sinusoidal waveform, which only requires a relatively small sine look-up table. For example, for an RPM 5400 hard disk drive with a 0.154 ms sampling rate, the maximum seeking time without a coast mode is about 10 ms. Then, a table must be about 2*[(10/0.154)-20]2*(65-20)=90 entries long. That the seeking time is about 10 ms means that the sinusoidal wave maximum period is about 10 ms. Thus, a table having 100 entries is sufficiently practical.

Figure 5A:
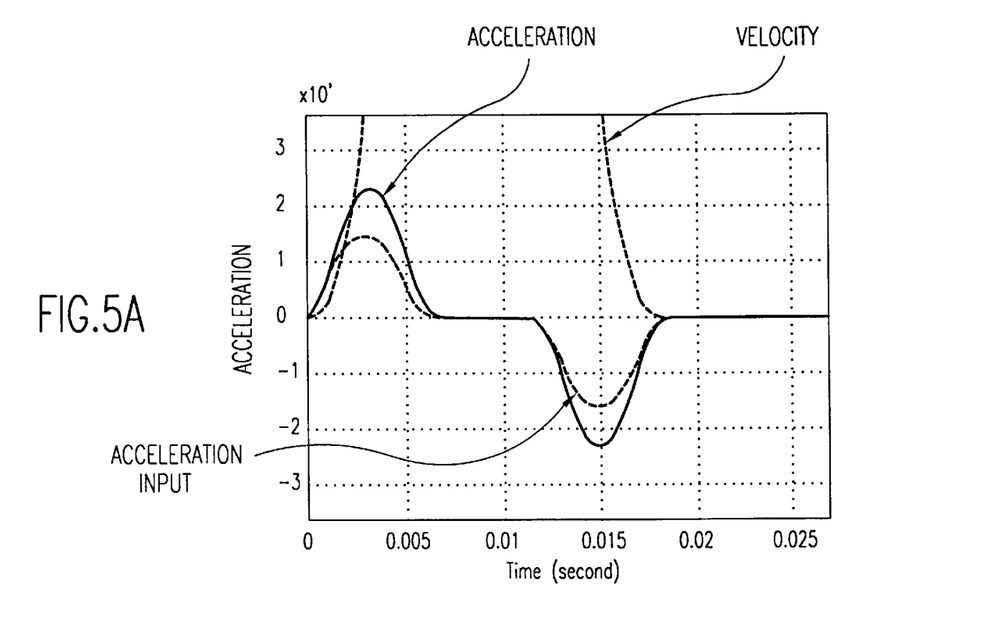
FIG. 5A is a graph showing an acceleration trajectory profile according to a preferred embodiment of the current invention, using a continuous sinusoidal function at ⅓ full stoke seeking length.
Figure 5B:
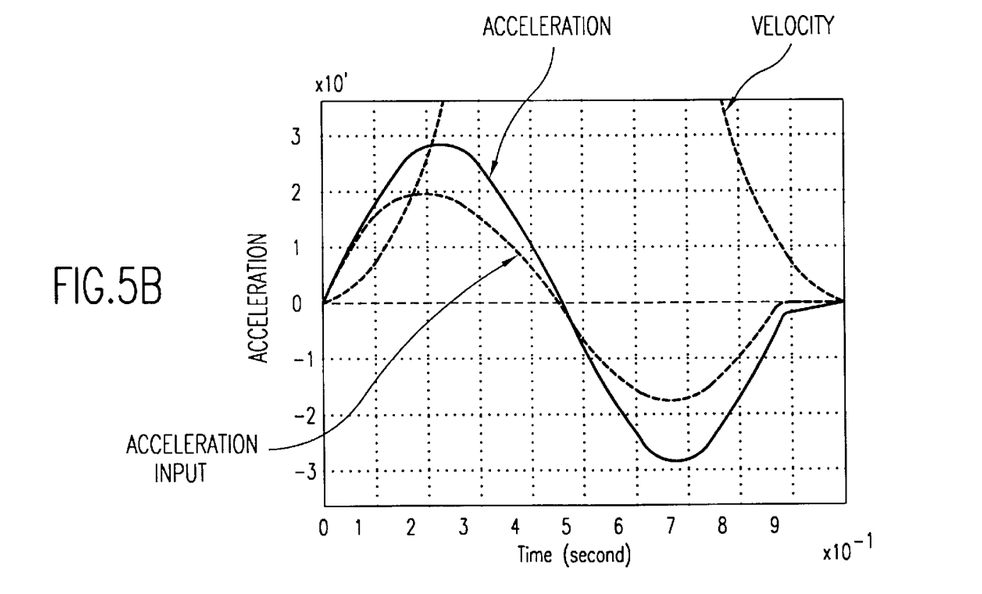
FIG. 5B is a graph showing an acceleration trajectory profiles according to a preferred embodiment of the current invention, using a segment sinusoidal waveform, and a longer seeking length.

FIG. 5A is a graph showing an acceleration trajectory profile according to a preferred embodiment of the current invention, using a continuous sinusoidal function at ⅓ full stoke seeking length. FIG. 5B is a graph showing an acceleration trajectory profiles according to a preferred embodiment of the current invention, using a segment sinusoidal waveform, and a longer seeking length.

Figure 6:
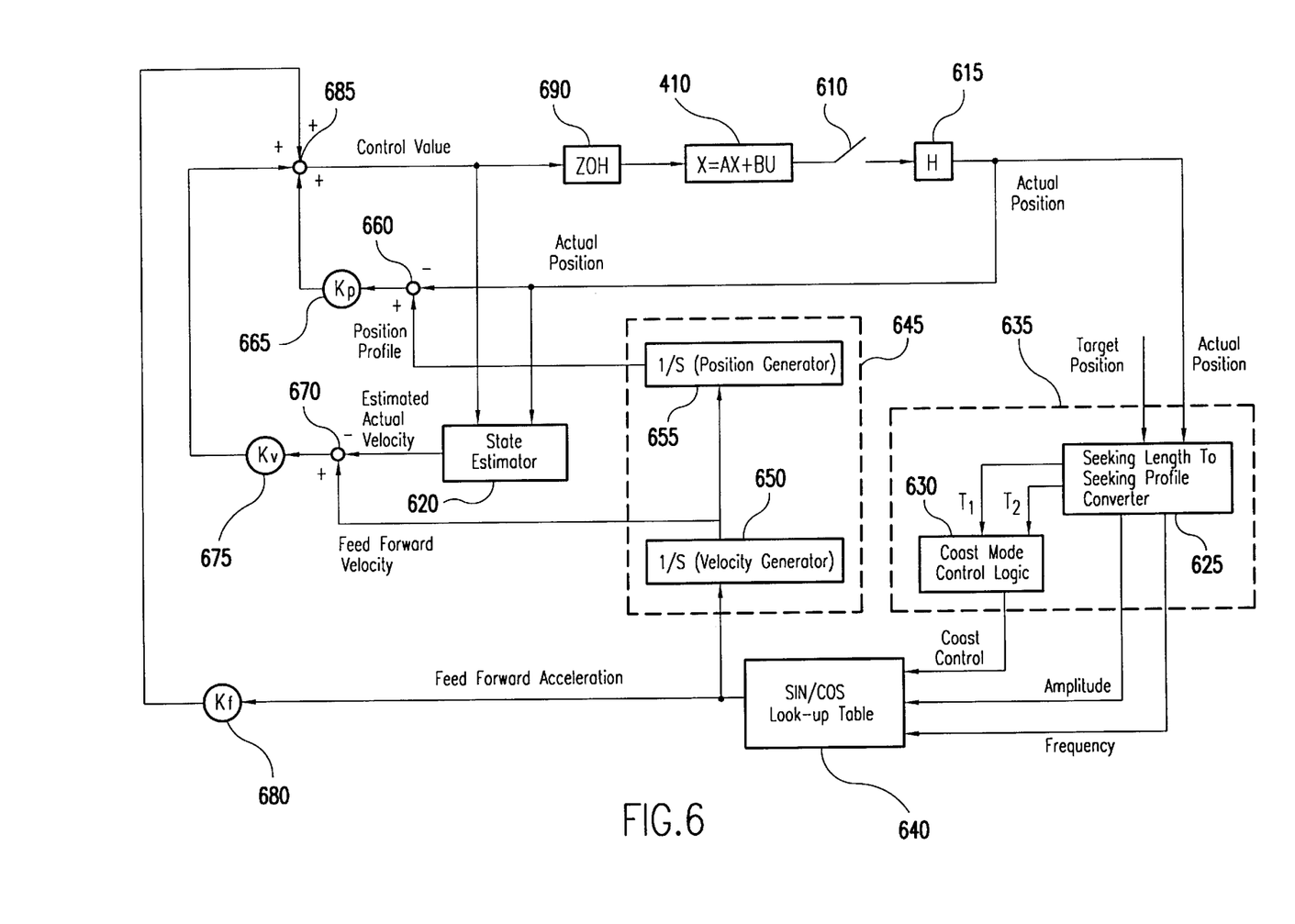
FIG. 6 is a block diagram showing the processing of the projected position, velocity, and acceleration according to a preferred embodiment of the present invention.
Figure 7:
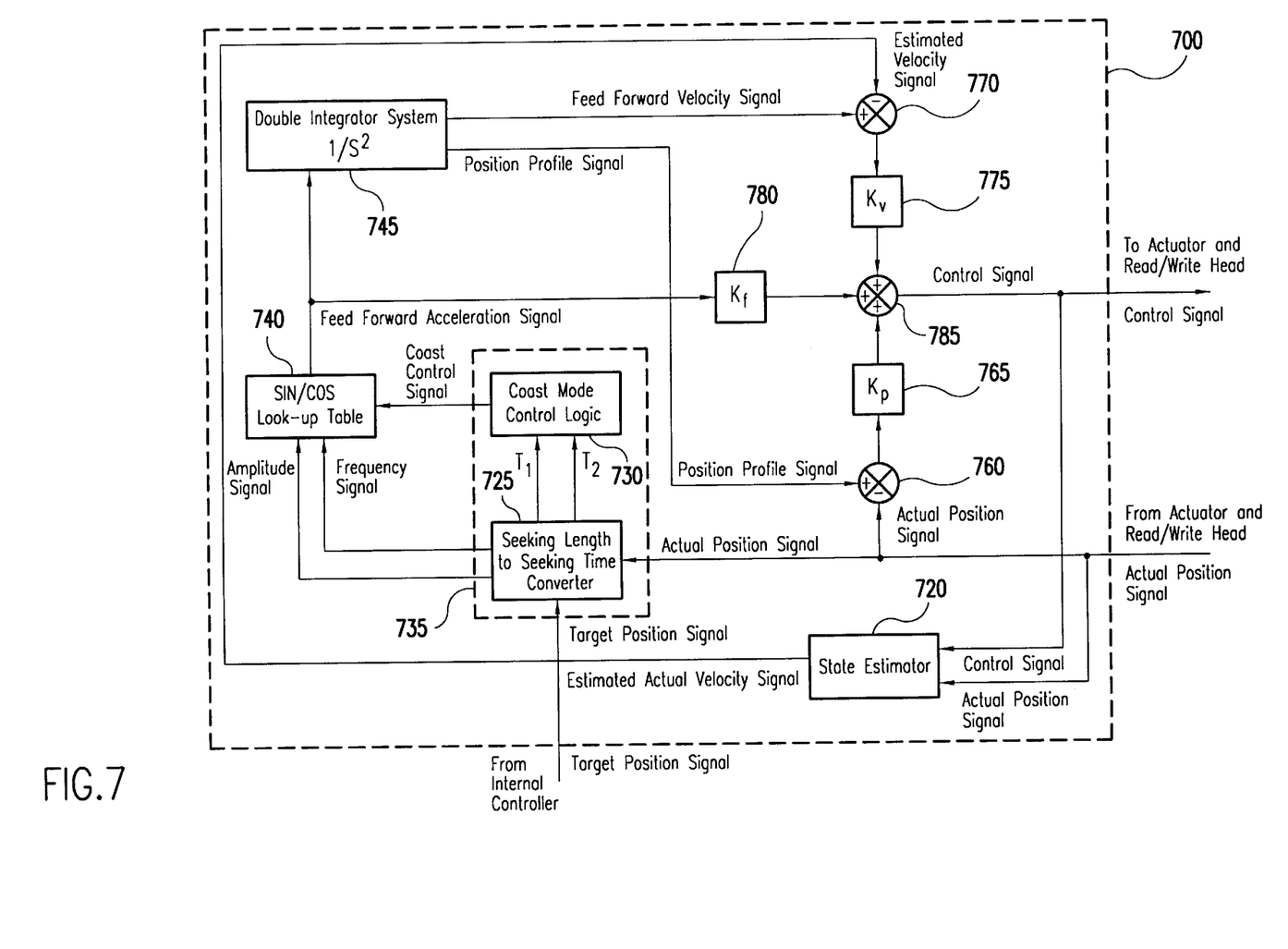
FIG. 7 is a circuit diagram showing a circuit implementing the block diagram of FIG. 6 according to a preferred embodiment of the present invention.

FIG. 6 is a block diagram showing the processing of the projected position, velocity, and acceleration of a system according to a preferred embodiment of the present invention, and FIG. 7 is a circuit diagram showing a circuit implementing the block diagram of FIG. 6 according to a preferred embodiment of the present invention.

As shown in FIG. 6, an analog position signal produced from the actuator 410 indicates the actual location of an HDD actuator read/write head with respect to the tracks on a hard disk. This analog actual position signal is passed through a sampler 610 and an analog-to-digital converter 615 to produce a digital actual position indicative of the actual location of the read/write head. This actual position signal is provided to a state estimator 620 and a seeking length to seeking profile converter 625.

The seeking length to seeking profile converter 625 accepts as an input the actual position of the read/write head from the actuator 410, and the target position from an external controller (not shown). Based on the actual position at the start of the seeking operation and the target position, the seeking length to seeking profile converter 625 determines: A, the amplitude of the desired seeking profile in Amperes, $\bar{\omega}$, the frequency of the desired seeking profile in units of rad/sec, $T_1$, the start time of any required coast mode in seconds from the beginning of the seeking operation, and $T_2$, the end time of any required coast mode in seconds from the beginning of the seeking operation. The specific equations employed by the seeking length to seeking profile converter 625 are discussed in more detail below.

The start and stop times of any required coast mode, $T_1$ and $T_2$, are supplied to a coast mode control logic 630, which measures the elapsed time and generates a coast control signal, if necessary, during the time when a coast mode should be implemented.

The seeking length to seeking profile converter 625 and the coast mode control logic 630 together comprise a feed forward acceleration controller 635.

The feed forward acceleration controller 635 provides the coast control, the amplitude A, and the frequency $\bar{\omega}$ to a sine/cosine lookup table 640. The sine/cosine lookup table 640 provides as a feed forward acceleration signal, a sine wave having an amplitude and frequency according to the received amplitude and frequency A and $\bar{\omega}$. The feed forward acceleration is interrupted for the duration of a coast mode, if any, as indicated by the coast control. When the coast control indicates the start of a coast mode, the feed forward acceleration signal will be stopped until the coast control indicates the end of the coast mode.

The feed forward acceleration is provided to a double integrator 645 that integrates the acceleration twice to generate a feed forward velocity and a position profile. The double integrator 645 is made up of two single integrators, a velocity generator 650 that integrates the feed forward acceleration to generate a feed forward velocity, and a position generator 655 that integrates the feed forward velocity to generate a position profile.

The position generator 655 in the double integrator 645 provides the position profile to a positive input of a first adder 660. The digital-to-analog converter 615 in turn provides the actual position to a negative input of the first adder 660. The output of the first adder 660 is then provided to a first state controller 665.

The velocity generator 650 in the double integrator 645 provides the feed forward velocity to a positive input of a second adder 670. The state estimator 620 in turn generates an estimated actual velocity based on the actual position and a control value, and provides this predicted velocity to a negative input of the second adder 670. The output of the second adder 670 is then provided to a second state controller 675.

The feed forward acceleration generated by the sine/cosine lookup table 640 is provided to a third state controller 680.

The output signals from the first, second, and third state controllers 665 and 675, and 680 are provided to respective positive inputs of a third adder 685. The output of the third adder 685 is the control value used to control the operation of the actuator 410 and to assist the state estimator 620 in its determination of the estimated actual velocity. This digital control value is provided to a digital-to-analog converter, such as a zero order hold 690, which converts the value to an analog value that controls the operation of the actuator 410.

FIG. 7 is a circuit diagram showing a circuit implementing the block diagram of FIG. 6 according to a preferred embodiment of the present invention. As shown in FIG. 7, a seeking control logic 700 receives from the actuator 410 a signal indicating the actual position of the actuator 410, and receives from an internal HDD controller (not shown) a signal indicating the actuator's target position. The seeking control logic 700 provides a control signal to the actuator 410 to control its movement in a seeking operation.

As shown in FIG. 6, the actual position signal and the control signal are both digital signals. Proper conversion circuitry (not shown) corresponding to the sampler 610, analog-to-digital converter 615, and digital-to-analog converter 690 are used to convert these signals to and from the analog signals used by the actuator control circuitry.

The actual position signal is provided to a state estimator 720, a negative input to a first adder 760, and a seeking length to seeking time converter 725 contained in a feed forward acceleration controller 735.

The state estimator 720 accepts the control signal and the actual position signal and generates an estimated actual velocity signal that is provided to a negative input of the second adder 770.

The seeking length to time converter 725 accepts the actual position signal and the target position signal and from these generates an amplitude signal, a frequency signal, a coast time start signal $T_1$, and a coast time stop signal $T_2$.

The coast time start and stop signals $T_1$ and $T_2$ are provided to a coast mode control logic 730 contained in the feed forward acceleration controller 735. The coast mode control logic 730 outputs a coast control signal that indicates when a coast mode should begin and end, if indeed a coast mode is needed for a given seeking operation. The coast mode control logic 730 follows the elapsed seeking time through the use of digital signal processing, and indicates via the coast control signal when in the seeking time the coast mode starts and when it ends.

The amplitude and frequency signals are provided to a sine/cosine look-up table 740, which provides as a feed forward acceleration signal a sine wave having an amplitude and frequency in accordance with those parameters. During a coast mode, as indicated by the coast control signal, the sine/cosine look-up table 740 outputs no signal at all, indicating that the actuator should not be accelerated during the coast mode.

The feed forward acceleration signal is provided to a double integrator system 745 and a third state controller 780. The double integrator system 745 integrates the feed forward acceleration signal twice to provide a feed forward velocity signal and a position profile signal. The position profile signal is provided to a positive input of the first adder 760, While the feed forward velocity signal is provided to a positive input of the second adder 770.

The first adder 760 accepts the actual position signal in a negative input and the position profile signal in a positive input, and provides the sum to a first state controller 765. The second adder 770 accepts the estimated velocity signal in a negative input and the feed forward velocity signal in a positive input, and provides the sum to a second state controller 775.

The outputs of the first, second, and third state controllers 765, 775, and 780 are provided to respective positive inputs of a third adder 785. The third adder 785 sums these three signals together and provides the result as the control signal.

In both the block diagram of FIG. 6 and the circuit diagram of FIG. 7, the feed forward acceleration, or seeking profile as it can also be called, is determined by the sine/cosine look-up table 640, 740 to be:

$$i = A\sin(\overline{\omega}t) \qquad \text{with no coast mode} \qquad (1)$$

$$i = \begin{cases} A\sin(\overline{\omega} \cdot t); 0 \le t \le T_1 \\ 0; T_1 < t < T_2 \\ -A\sin[\overline{\omega}(t - T_2)]; T_2 \le t \le T_f \end{cases} \qquad \text{with a coast mode} \qquad (2)$$

where i is the feed forward acceleration (or seeking profile) current, in Amperes; A is the amplitude of the desired seeking profile in Amperes; $\overline{\omega}$ is the frequency of the desired seeking profile in units of rad/sec; and t is the elapsed time of a seeking operation in seconds. The amplitude A and frequency $\overline{\omega}$ are determined as follows. For ease of description, this discussion will be made specifically with reference to the circuit of FIG. 7.

As this shows, where there is no coast mode, a continuous sinusoidal waveform is used. However, when a coast mode is required, a segmented waveform is used. The segmented waveform has an initial sinusoidal waveform, an interim zero-level waveform, and a final sinusoidal waveform. The initial sinusoidal waveform and the final sinusoidal waveform are inverse waveforms.

The determination of amplitude A and frequency $\overline{\omega}$ is made only at the beginning of the seeking operation, as the amplitude and frequency of the feed forward acceleration remain constant throughout the entire seeking process. As shown in equation (2), the exact signal that is output may change if a coast mode is required, but the values for amplitude A and frequency $\overline{\omega}$ remain constant for any given seeking operation.

In determining values for amplitude A and frequency $\overline{\omega}$, the seeking length to seeking time converter 735 accepts the actual position signal X(t) from the actuator 410 and a target position signal from an outside controller. At the start of the seeking process, the seeking length to seeking time converter 735 determines the total seeking length $X_{total}$ of the process based on the actual starting position, $X_{start}$ and the target position $X_{target}$ according to the following equations:

$$X_{start} = X(0) \qquad (3)$$

$$X_{total} = X_{target} - X_{start} \qquad (4)$$

where X(0) and $X_{start}$ are the seeking start position; $X_{target}$ is the seeking target position; and $X_{total}$ is the total seeking length, and all are in lengths of tracks.

Next, the seeking length to seeking time converter 735 determines whether a coast mode is required by comparing $X_{total}$ to a threshold distance $X_{threshold}$ determined by experimentation. Typically, the threshold distance $X_{threshold}$ is set to be one-third of the maximum seeking length $X_{max}$. If $X_{total} \le X_{threshold}$, then no coast mode is required. If $X_{total} > X_{threshold}$, then a coast mode must be used.

If the seeking length to seeking time converter 735 determines that no coast mode is required, it generates a continuous sinusoidal wave form. In this operation, the seeking length to seeking time converter 735 determines the amplitude signal A and frequency signal $\overline{\omega}$ based on the following equations:

$$A = \frac{2\pi \cdot X_{total}}{T_f^2 K_m} \tag{5}$$

$$\varpi = \frac{2\pi}{T_f} \tag{6}$$

$$T_f = K_f \cdot X_{total} \tag{7}$$

where A is the amplitude of the desired seeking profile in Amperes; $\overline{\omega}$ is the frequency of the desired seeking profile in units of rad/sec; $X_{total}$ is the total seeking length in lengths of tracks; $K_m$ is constant related to a given actuator in tracks/(A)(sec$^2$), which is obtained by dividing the actuator's torque constant by the inertia of the VCM motion portion, both of which parameters are provided by the vendor of the actuator arm; $K_f$ is a constant for a given HDD in sec/track, which is obtained by experimentation; and $T_f$ is the seeking time, or terminal time, in seconds.

However, because the seeking control logic 700 has a physical upper limit to the feed forward acceleration amplitude A, i.e., $A_{max}$, the system must account for seeking operations that would otherwise require the amplitude signal A to be greater than $A_{max}$. Therefore, if equation (5) requires that the amplitude be greater than or equal to $A_{max}$, the amplitude signal A and the frequency signal $\overline{\omega}$ are calculated according to the following equations:

$$A = A_{max} \tag{8}$$

$$\varpi = \frac{2\pi}{T_f} \tag{6}$$

$$T_f = \sqrt{\frac{2\pi \cdot X_{total}}{A_{max} K_m}} \tag{9}$$

where A is the amplitude of the desired seeking profile in Amperes; $\overline{\omega}$ is the frequency of the desired seeking profile in units of rad/sec; $T_f$ is the seeking time, in seconds; $A_{max}$ is the upper limit of the acceleration based on the particular HDD used; $K_m$ is constant related to a given actuator in tracks/(A)(sec$^2$), which is obtained by dividing the actuator's torque constant by the inertia of the VCM motion portion, both of which parameters are provided by the vendor of the actuator arm; and $X_{total}$ is the total seeking length in lengths of tracks.

In addition, because there is no coast mode, the coast mode start and stop time signals $T_1$ and $T_2$ are preferably set to be equal to each other, to indicate that the coast mode control logic 730 should not create a coast mode with the coast control signal. Preferably the coast mode start and stop time signals $T_1$ and $T_2$ are set according to the following equation:

$$T_1 = T_2 = \frac{T_f}{2} \tag{10}$$

where $T_1$ is the start time of a coast mode in seconds from the beginning of the seeking operation; $T_2$ is the end time of a coast mode in seconds from the beginning of the seeking operation; and $T_f$ is the seeking time in seconds, calculated according to equation (7) or (9), as appropriate.

If, however, the seeking length to seeking time converter 735 determines that a coast mode will be required, it generates a segmented sinusoidal wave form that has an initial sinusoidal waveform, a zero-level interim waveform, and a final sinusoidal waveform. In this operation, the seeking length to seeking time converter 735 determines the amplitude signal A, frequency signal $\overline{\omega}$, coast mode start signal $T_1$, and the coast mode stop $T_2$, based on the following equations:

$$A = \frac{\pi \cdot V_{max}}{2T_1 K_m} \tag{11}$$

$$\varpi = \frac{\pi}{T_1} \tag{12}$$

$$T_1 = T_f - T_2 \tag{13}$$

$$T_2 = \frac{A^* T_f^2 K_m}{2\pi \cdot V_{max}} \tag{14}$$

$$A^* = \frac{2\pi \cdot X_{total}}{T_f^2 K_m} \tag{15}$$

$$T_f = K_f \cdot X_{total} \tag{7}$$

where A is the amplitude of the desired seeking profile in Amperes; $\overline{\omega}$ is the frequency of the desired seeking profile in units of rad/sec; $T_1$ is the start time of a coast mode in seconds from the beginning of the seeking operation; $T_2$ is the end time of a coast mode in seconds from the beginning of the seeking operation; $A^*$ is an ideal acceleration and seeking time without any limitations; $V_{max}$ is the upper limit of the actuator velocity based on the particular HDD used; $T_f$ is the seeking time in seconds; $X_{total}$ is the total seeking length in lengths of tracks; and $K_m$ is constant related to a given actuator in tracks/(A)(sec$^2$), which is obtained by dividing the actuator's torque constant by the inertia of the VCM motion portion, both of which parameters are provided by the vendor of the actuator arm.

However, as with the case where no coast mode is used, the seeking control logic 700 still has a physical upper limit to the feed forward acceleration amplitude A it can use, i.e., $A_{max}$. As a result, the system must account for seeking operations that would otherwise require the amplitude signal A to be greater than $A_{max}$. Therefore, if equation (11) requires that the amplitude be greater than or equal to $A_{max}$, the amplitude signal A, the frequency signal $\overline{\omega}$ the coast mode start time signal $T_1$, and the coast mode stop time signal $T_2$ are calculated according to the following equations:

$$A = A_{max} \tag{16}$$

$$\varpi = \frac{\pi}{T_1} \tag{17}$$

$$T_1 = \frac{\pi \cdot V_{max}}{2A_{max} K_m} \tag{18}$$

$$T_2 = \frac{X_{total} - X_{max}}{V_{max}} + T_1 \tag{19}$$

$$X_{max} = \frac{\pi \cdot V_{max}^2}{2A_{max} K_m} \tag{20}$$

where A is the amplitude of the desired seeking profile in Amperes; $\overline{\omega}$ is the frequency of the desired seeking profile in units of rad/sec; $T_1$ is the start time of a coast mode in seconds from the beginning of the seeking operation; $T_2$ is the end time of a coast mode in seconds from the beginning of the seeking operation; $A_{max}$ and $V_{max}$ are the upper limits of the velocity and acceleration based on the particular HDD used; and $X_{max}$ is a constant distance in tracks based on $A_{max}$ and $V_{max}$.

According to the principle of this invention, the whole seeking operation can be considered as two basic operation functions. The first function is a track seek mode of sinusoidal or segment sinusoidal trajectory, which is designed to minimize the harmonic content in actuator control signal. The second function is realized through the transfer mode and the track following mode. As noted above, these are substantially similar to the modes used in conventional control systems. In the time domain, the track seek mode significantly determines the seeking time. The another two modes will determine the minor part of the seeking time, e.g., about 10%. The transfer mode is designed to accelerate the transient process between the end of the sinusoidal trajectory seeking mode and the beginning of the track following mode.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

For example, although the preferred embodiment is shown as being a method and apparatus for positioning an actuator in an HDD system, it can obviously be used to manipulate the motion of any sort of transducer such as a magnetic head, an optical head or a print head etc., in any other high-speed servo control devices, and such applications are supported by the current invention.

What is claimed:

1. A control circuit for controlling a seeking operation for an actuator in a high speed servo device, the control circuit comprising:
    a state estimator for receiving an actual position signal that indicates the current actual position of the actuator and for generating an estimated actual velocity signal;
    a feed forward acceleration generation circuit for generating a sinusoidal feed forward acceleration signal based on the actual position signal at a starting point and a target position signal that indicates a target seek track;
    a double integrator for integrating the feed forward acceleration signal once to generate a feed forward velocity signal and twice to generate a position profile signal;
    a first correction circuit for generating a first correction signal based on the actual position signal and the position profile signal;
    a second correction circuit for generating a second correction signal based on the estimated actual velocity signal and the feed forward velocity signal; and
    a control signal generation circuit for generating a control signal to control the operation of the actuator based on the feed forward acceleration signal, the first correction signal, and the second correction signal,
    wherein the control signal is also supplied to the state estimator.

2. A control circuit as recited in claim 1, wherein the feed forward acceleration generation circuit further comprises:
    a feed forward acceleration controller for generating an amplitude signal and a frequency signal based on the actual position signal at the starting point and the target position signal; and
    a sine/cosine look-up table for generating the feed forward acceleration signal in accordance with the amplitude signal and the frequency signal.

3. A control circuit as recited in claim 1, wherein the first correction circuit comprises an adder that accepts the actual position signal at a negative input and the position profile signal at a positive input.

4. A control circuit as recited in claim 1, wherein the second correction circuit comprises an adder that accepts the estimated actual velocity signal at a negative input and the feed forward velocity signal at a positive input.

5. A control circuit as recited in claim 1, wherein the high speed servo device is a hard disk drive.

6. A control circuit as recited in claim 1, wherein the feed forward acceleration signal has a continuous sinusoidal waveform when the seeking operation does not require a coast mode and has a segmented sinusoidal waveform when the seeking operation requires a coast mode.

7. A control circuit as recited in claim 6, wherein the feed forward acceleration signal, i, is calculated according to the following equations:

$$i = A \sin(\bar{\omega} t)$$

when no coast mode is required, and $$i = \begin{cases} A\sin(\bar{\omega} \cdot t); & 0 \le t \le T_1 \\ 0; & T_1 < t < T_2 \\ -A\sin[\bar{\omega}(t - T_2)]; & T_2 \le t \le T_f \end{cases}$$

when a coast mode is required, where A is the amplitude of the desired feed forward acceleration signal in Amperes; $\bar{\omega}$ is the frequency of the desired feed forward acceleration signal in rad/sec; and t is the elapsed time of a seeking operation in seconds.

8. A control circuit as recited in claim 6, wherein the feed forward acceleration generation circuit determines whether the seeking operation requires a coast mode by determining whether a total seeking length is greater than a threshold seeking length, wherein the total seeking length is determined by comparing the target position signal with the starting position signal.

9. A control circuit as recited in claim 8, wherein the feed forward acceleration generation circuit further comprises:
    a seeking length to seeking time converter for generating an amplitude signal and a frequency signal based on the actual position signal at the starting point and the target position signal, and for generating a coast mode start time signal and a coast mode stop time signal that indicate the starting and stopping times, respectively, of a coast mode;
    a coast mode control logic for generating a coast control signal based on the coast mode start time signal and the coast mode stop time signal; and
    a sine/cosine look-up table for generating the feed forward acceleration signal in accordance with the amplitude signal, the frequency signal, and the coast control signal.

10. A control circuit as recited in claim 9, wherein the amplitude signal, the frequency signal, the coast mode start time signal, and the coast mode stop time signal are determined by the following equations when the seeking operation does not require a coast mode:

$$A = \frac{2\pi \cdot X_{total}}{T_f^2 K_m},$$

$$\varpi = \frac{2\pi}{T_f},$$

$$T_f = K_f \cdot X_{total},$$

$$T_1 = T_2 = \frac{T_f}{2},$$

wherein A is the amplitude of the feed forward acceleration signal in Amperes; $\varpi$ is the frequency of the feed forward acceleration signal in rad/sec; $T_1$ is the coast mode start time signal in seconds from the beginning of the seeking operation; $T_2$ is the coast mode end time signal in seconds from the beginning of the seeking operation; $X_{total}$ is the total seeking length in lengths of tracks; $K_m$ is a first constant related to the actuator in tracks/(A)(sec$^2$); $K_f$ is a second constant for the high speed servo device in sec/track; and $T_f$ is a seeking time in seconds.

11. A control circuit as recited in claim 10, wherein if the calculated amplitude exceeds a maximum amplitude, the amplitude signal, the frequency signal, the coast mode start time signal, and the coast mode stop time signal are instead determined by the following equations:

$$A = A_{max},$$

$$\varpi = \frac{2\pi}{T_f},$$

$$T_f = \sqrt{\frac{2\pi \cdot X_{total}}{A_{max}K_m}}, \text{ and}$$

$$T_1 = T_2 = \frac{T_f}{2},$$

wherein A is the amplitude of the feed forward acceleration signal in Amperes; $\varpi$ is the frequency of the feed forward acceleration signal in rad/sec; $T_1$ is the coast mode start time signal in seconds from the beginning of the seeking operation; $T_2$ is the coast mode end time signal in seconds from the beginning of the seeking operation; $T_f$ is the seeking time in seconds; $A_{max}$ is an upper limit of the feed forward acceleration based on the particular high speed servo device used; $K_m$ is the first constant related to the actuator in tracks/(A)(sec$^2$); and $X_{total}$ is the total seeking length in tracks.

12. A control circuit as recited in claim 9, wherein the amplitude signal, the frequency signal, the coast mode start time signal, and the coast mode stop time signal are determined by the following equations when the seeking operation requires a coast mode:

$$A = \frac{\pi \cdot V_{max}}{2T_1 K_m},$$

$$\varpi = \frac{\pi}{T_1},$$

$$T_1 = T_f - T_2,$$

$$T_2 = \frac{A^* T_f^2 K_m}{2\pi \cdot V_{max}},$$

$$A^* = \frac{2\pi \cdot X_{total}}{T_f^2 K_m}, \text{ and}$$

-continued $$T_f = K_f \cdot X_{total},$$

wherein A is the amplitude of the feed forward acceleration signal in Amperes; $\varpi$ is the frequency of the feed forward acceleration signal in rad/sec; $T_1$ is the coast mode start time signal in seconds from the beginning of the seeking operation; $T_2$ is the coast mode end time signal in seconds from the beginning of the seeking operation; A* is an ideal acceleration and seeking time without any limitations; $V_{max}$ is an upper limit of the actuator velocity for the high speed servo device; $T_f$ is a seeking time in seconds; $X_{total}$ is a total seeking length in lengths of tracks; and $K_m$ is constant related to the actuator in tracks/(A)(sec$^2$).

13. A control circuit as recited in claim 12, wherein if the calculated amplitude exceeds a maximum amplitude, the amplitude signal, the frequency signal, the coast mode start time signal, and the coast mode stop time signal are instead determined by the following equations:

$$A = A_{max},$$

$$\varpi = \frac{\pi}{T_1},$$

$$T_1 = \frac{\pi \cdot V_{max}}{2A_{max}K_m},$$

$$T_2 = \frac{X_{total} - X_{max}}{V_{max}} + T_1, \text{ and}$$

$$X_{max} = \frac{\pi \cdot V_{max}^2}{2A_{max}K_m},$$

wherein A is the amplitude of the feed forward acceleration signal in Amperes; $\varpi$ is the frequency of the feed forward acceleration signal in rad/sec; $T_1$ is the coast mode start time signal in seconds from the beginning of the seeking operation; $T_2$ is the coast mode end time signal in seconds from the beginning of the seeking operation; $A_{max}$ and $V_{max}$ are upper limits of the velocity and acceleration based on the particular high speed servo device; and $X_{max}$ is a constant distance in tracks.

14. A method for controlling a seeking operation for an actuator in a high speed servo device, the method comprising:

generating an estimated actual velocity for the actuator based on a current actual position of the actuator and a control value;

generating a sinusoidal feed forward acceleration for the actuator based on a starting actual position of the actuator, which indicates a starting track at the beginning of the seeking operation, and a target position for the actuator, which indicates a target track for the seeking operation;

generating a feed forward velocity that is the integral of the feed forward acceleration;

generating a position profile that is the integral of the feed forward velocity;

generating a first correction value based on the current actual position and the position profile;

generating a second correction value based on the estimated actual velocity and the feed forward velocity;

generating the control value based on the feed forward acceleration, the first correction value, and the second correction value; and controlling the movement of the actuator based on the control value.

15. A method for controlling a seeking operation for an actuator in a high speed in servo device, as recited in claim 14, wherein the step of generating the feed forward acceleration further comprises:

generating an amplitude and a frequency based on the starting actual position and the target position; and generating the feed forward acceleration in accordance with the amplitude and the frequency by looking up sine values in a sine/cosine look-up table.

16. A method for controlling a seeking operation for an actuator in a high speed servo device, as recited in claim 14, wherein the first correction value is the position profile minus the current actual position.

17. A method for controlling a seeking operation for an actuator in a high speed servo device, as recited in claim 14, wherein the second correction value is the feed forward velocity minus the estimated actual velocity.

18. A method for controlling a seeking operation for an actuator in a high speed servo device, claim 14, wherein the high speed servo device is a hard disk drive.

19. A method for controlling a seeking operation for an actuator in a high speed servo device, claim 14, wherein the feed forward acceleration has a continuous sinusoidal waveform when the seeking operation does not require a coast mode and has a segmented sinusoidal waveform when the seeking operation requires a coast mode.

20. A method for controlling a seeking operation for an actuator in a high speed servo device, as recited in claim 19, wherein the feed forward acceleration, i, is calculated according to the following equations:

$$i = A \sin(\overline{\omega} t)$$

when no coast mode is required, and $$i = \begin{cases} A\sin(\overline{\omega} \cdot t); & 0 \leq t \leq T_1 \\ 0; & T_1 < t < T_2 \\ -A\sin[\overline{\omega}(t - T_2)]; & T_2 \leq t \leq T_f \end{cases}$$

when a coast mode is required, where A is the amplitude of the desired feed forward acceleration in Amperes; $\overline{\omega}$ is the frequency of the desired feed forward acceleration in rad/sec; and t is the elapsed time of a seeking operation in seconds.

21. A method for controlling a seeking operation for an actuator in a high speed servo device, as recited in claim 19, wherein the step of generating the feed forward acceleration determines whether the seeking operation requires a coast mode by determining whether a total seeking length is greater than a threshold seeking length, wherein the total seeking length is determined by comparing the target position with the starting actual position.

22. A method for controlling a seeking operation for an actuator in a high speed servo device, as recited in claim 21, wherein the step of generating the feed forward acceleration further comprises:

generating an amplitude and a frequency signal based on the starting actual position and the target position;

determining a coast mode start time and a coast mode stop time that indicate the starting and stopping times, respectively, of a coast mode;

generating a coast control based on the coast mode start time and the coast mode stop time; and generating the feed forward acceleration in accordance with the amplitude, the frequency, and the coast control by looking up sine values for the feed forward acceleration in a sine/cosine look-up table when the seeking operation is not in the coast mode and by applying a zero-value to the feed forward acceleration when the seeking operation is in the coast mode.

23. A method for controlling a seeking operation for an actuator in a high speed servo device, as recited in claim 22, wherein the amplitude, the frequency, the coast mode start time, and the coast mode stop time are determined by the following equations when the seeking operation does not require a coast mode:

$$A = \frac{2\pi \cdot X_{total}}{T_f^2 K_m},$$

$$\overline{\omega} = \frac{2\pi}{T_f},$$

$$T_f = K_f \cdot X_{total},$$

$$T_1 = T_2 = \frac{T_f}{2},$$

wherein A is the amplitude of the feed forward acceleration in Amperes; $\overline{\omega}$ is the frequency of the feed forward acceleration in rad/sec; $T_1$ is the coast mode start time in seconds from the beginning of the seeking operation; $T_2$ is the coast mode end time in seconds from the beginning of the seeking operation; $X_{total}$ is the total seeking length in lengths of tracks; $K_m$ is a first constant related to the actuator in tracks/(A)(sec$^2$); $K_f$ is a second constant for the high speed servo device in sec/track; and $T_f$ is a seeking-time in seconds.

24. A method for controlling a seeking operation for an actuator in a high speed servo device, claim 23, wherein if the calculated amplitude exceeds a maximum amplitude, the amplitude, the frequency, the coast mode start time, and the coast mode stop time are instead determined by the following equations:

$$A = A_{max},$$

$$\overline{\omega} = \frac{2\pi}{T_f},$$

$$T_f = \sqrt{\frac{2\pi \cdot X_{total}}{A_{max} K_m}}, \text{ and}$$

$$T_1 = T_2 = \frac{T_f}{2},$$

wherein A is the amplitude of the feed forward acceleration in Amperes; $\overline{\omega}$ is the frequency of the feed forward acceleration in rad/sec; $T_1$ is the coast mode start time in seconds from the beginning of the seeking operation; $T_2$ is the coast mode end time in seconds from the beginning of the seeking operation; $T_f$ is the seeking time in seconds; $A_{max}$ is an upper limit of the feed forward acceleration based on the particular high speed servo device used; $K_m$ is the first constant related to the actuator in tracks/(A)(sec$^2$); and $X_{total}$ is the total seeking length in tracks.

25. A method for controlling a seeking operation for an actuator in a high speed servo device, as recited in claim 22, wherein the amplitude, the frequency, the coast mode start time, and the coast mode stop time are determined by the following equations when the seeking operation requires a coast mode:

$$A = \frac{\pi \cdot V_{max}}{2T_1 K_m},$$

$$\varpi = \frac{\pi}{T_1},$$

$$T_1 = T_f - T_2,$$

$$T_2 = \frac{A^* T_f^2}{2\pi \cdot V_{max}},$$

$$A^* = \frac{2\pi \cdot X_{total}}{T_f^2 K_m}, \text{ and}$$

$$T_f = K_f \cdot X_{total},$$

wherein A is the amplitude of the feed forward acceleration in Amperes; $\overline{\omega}$ is the frequency of the feed forward acceleration in rad/sec; $T_1$ is the coast mode start time in seconds from the beginning of the seeking operation; $T_2$ is the coast mode end time in seconds from the beginning of the seeking operation; $A^*$ is an ideal acceleration and seeking time without any limitations; $V_{max}$ is an upper limit of the actuator velocity for the high speed servo device; $T_f$ is a seeking time in seconds; $X_{total}$ is a total seeking length in lengths of tracks; and $K_m$ is constant related to the actuator in tracks/(A)(sec$^2$).

26. A method for controlling a seeking operation for an actuator in a high speed servo device, as recited in claim 25, wherein if the calculated amplitude exceeds a maximum amplitude, the amplitude, the frequency, the coast mode start time, and the coast mode stop time are instead determined by the following equations:

$$A = A_{max},$$

$$\varpi = \frac{2A_{max}}{V_{max}},$$

$$T_1 = \frac{\pi \cdot V_{max}}{2A_{max} K_m},$$

$$T_2 = \frac{X_{total} - X_{max}}{V_{max}} + T_1, \text{ and}$$

$$X_{max} = \frac{\pi \cdot V_{max}^2}{2A_{max} K_m},$$

wherein A is the amplitude of the feed forward acceleration in Amperes; $\overline{\omega}$ is the frequency of the feed forward acceleration in its of rad/sec; $T_1$ is the coast mode start time in seconds from the beginning of the seeking operation; $T_2$ is the coast mode end time in seconds from the beginning of the seeking operation; $A_{max}$ and $V_{max}$ are upper limits of the velocity and acceleration based on the particular high speed servo device; and $X_{max}$ is a constant distance in tracks based on $A_{max}$ and $V_{max}$.

* * * * *